Oct. 9, 1962 G. E. HORNSBY 3,057,586
AIRCRAFT LANDING GEAR
Filed Oct. 27, 1960 2 Sheets-Sheet 1
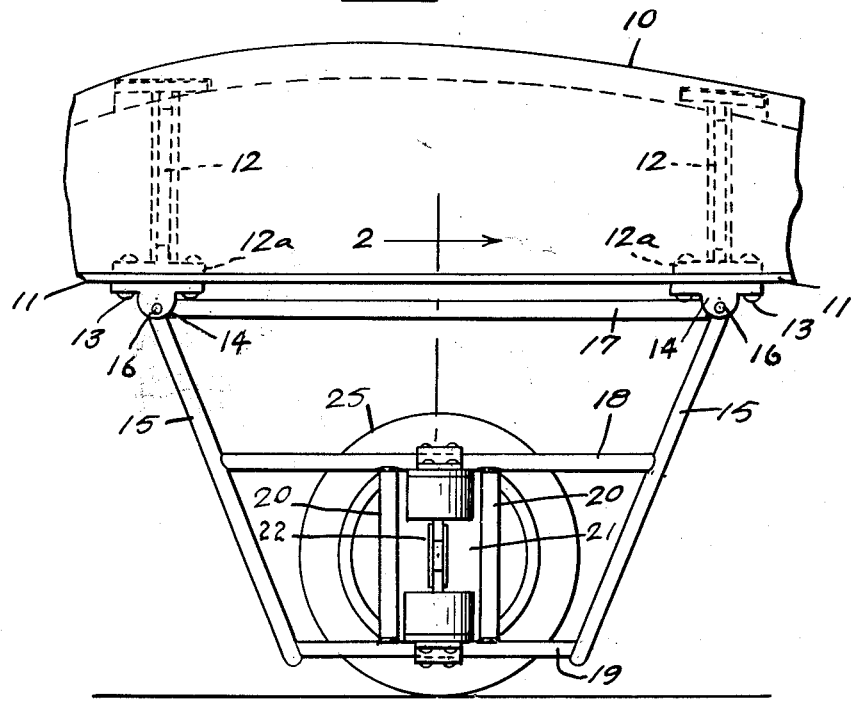
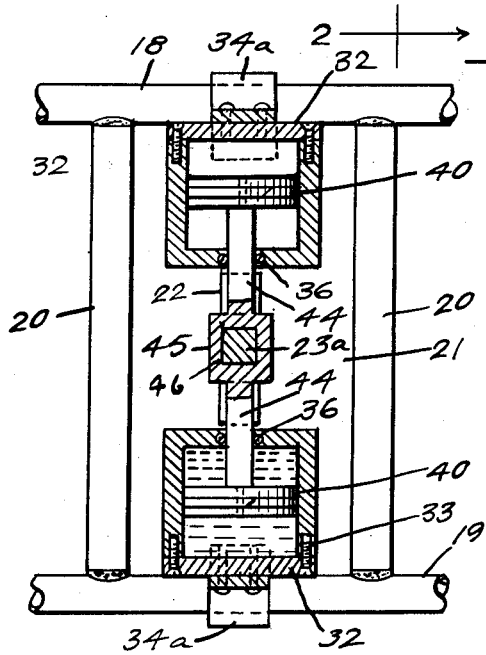
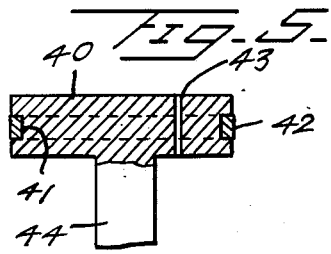
G. E. HORNSBY
INVENTOR
BY *CA Snowles*
ATTORNEYS.

Oct. 9, 1962  G. E. HORNSBY  3,057,586
AIRCRAFT LANDING GEAR
Filed Oct. 27, 1960  2 Sheets-Sheet 2
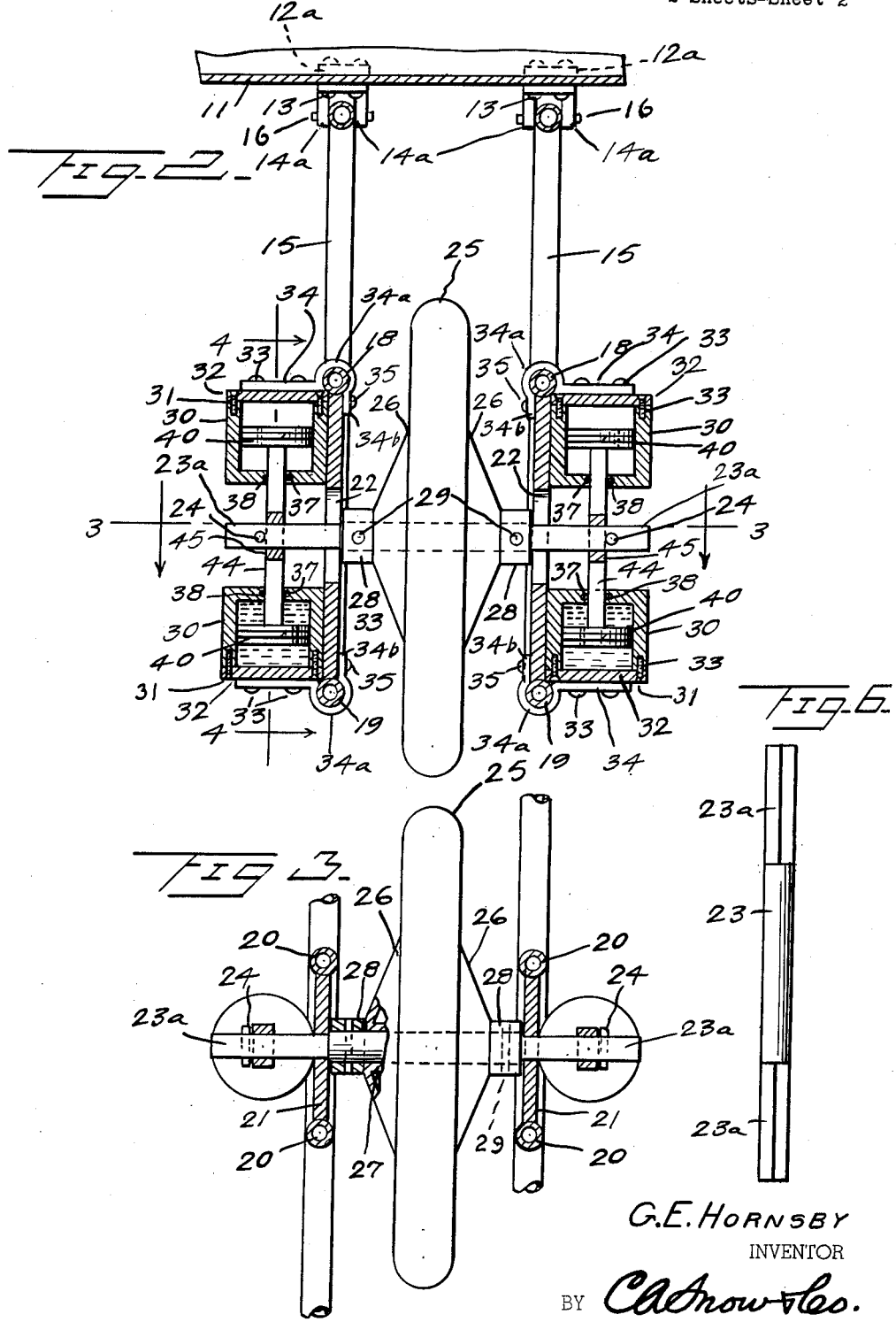
G. E. HORNSBY
INVENTOR
BY Ca Snow &Co.
ATTORNEYS.

United States Patent Office 3,057,586
Patented Oct. 9, 1962

3,057,586
AIRCRAFT LANDING GEAR
Guyton Ellis Hornsby, P. O. Box 122, Washington 4, D.C.
Filed Oct. 27, 1960, Ser. No. 65,391
2 Claims. (Cl. 244—104)

This invention relates to an aircraft landing gear embodying dual shock absorbers.

When an airplane is coming in for a landing, it has kinetic energy, due to its gross weight and the component of its velocity which is perpendicular to the ground. The quantity of this energy is a function of the gross weight and the square of the vertical component of the velocity. This energy must be absorbed in the time between the moment when the landing wheels first touch the ground and the start of the landing run, when the landing wheels are freely running along the ground. There are times when a smooth landing can be made and the tires on the landing wheels can alone absorb the shock of the impact. Such situations are, however, unusual due to conditions normally prevailing around airports. It is, therefore, desirable to provide an arrangement of shock absorbers with landing gears.

The object of the present invention is to provide an aircraft landing gear which includes dual shock absorbers for absorbing the shock of impact when the airplane is first set down on the ground and also absorbing the energy of the rebound.

Another object of the present invention is the provision of an aircraft landing gear which includes dual shock absorbers, each shock absorber including a pair of compressible fluid containing units, one unit of each pair being liquid filled and the other unit of each pair being air filled, the units and the pair of units acting in conjunction to absorb the impact of landing and the energy of the rebound.

A further object of the present invention is to provide an aircraft landing gear including shock absorbers in vertically aligned pairs symmetrically positioned on the opposite sides of the landing wheels.

Still other objects, advantages and improvements will become apparent from the following specification, taken in connection with the accompanying drawings, in which:

FIGURE 1 is a side elevational view of the aircraft landing gear according to the present invention.

FIG. 2 is a vertical sectional view, taken on the section line 2—2 of FIG. 1 and looking in the direction of the arrows, showing the vertically aligned shock absorbers on the opposite sides of the landing wheels.

FIG. 3 is a horizontal sectional view, taken on the section line 3—3 of FIG. 2 and looking in the direction of the arrows.

FIG. 4 is a vertical sectional view, taken on the section line 4—4 of FIG. 2 and looking in the direction of the arrows, showing the interior of the vertically aligned shock absorbers.

FIG. 5 is a detail view partly in section, of one of the pistons in the shock absorbers, and FIG. 6 is a detail view of the axle for the landing wheels.

Referring now to the drawings in detail and to FIG. 1 in particular, the fuselage or wing, as the case may be, of an airplane is here shown and is designated by the reference numeral 10. The wing has an undercover 11. Inside the wing there are spars 12, which extend longitudinally of the wing and have bottom flanges 12a supported on the undercover 11.

Brackets 14 are spaced transversely of the fuselage or wing and secure the undercarriage of the latter. These brackets are secured to the undercover 11 by bolts 13, which may be the same bolts that secure the flanges 12a of the spars to the undercover 11.

The undercarriage for each landing wheel is comprised by two (2) identical sections. Each section includes a pair of downwardly and inwardly inclined tubular members 15—15, which are struts, and upper, intermediate and lower tubular members 17, 18 and 19, which are tie rods. At their opposite ends the tie rods 17, 18 and 19 are secured to the struts 15—15, as by welding. The brackets 14 have parallel lugs 14a—14a thereon, as shown in FIG. 2. The undercarriage sections are received at their upper corners between these lugs and are held in place by bolts or pins 16, which extend through aligned holes in the lugs and the struts 15—15 and the respective ends of the upper tie rod 17 at the junction of the latter.

The structure so far described is that of a rigid landing gear, that is, one that is permanently secured to the under side of the fuselage or wing of an airplane. Such landing gears are effective for the purpose intended, but present frictional resistance to the flight of the airplane through the air. It will be understood that the present invention is equally adaptable to retractable landing gear, which latter are withdrawn within the fuselage of the airplane when the latter is in flight.

On the opposite sides of the vertical center line of each section of the undercarriage there are positioned pairs of parallel tubular bars 20—20, which are secured at their respective ends to the intermediate and the lower tie rods 18 and 19, as by welding. A plate 21 is mounted between the parallel tubular bars 20—20 and the intermediate tie rod 18 and lower tie rod 19, also by welding. This plate 21 has a bearing slot 22 formed along its vertical center line.

One of the axles for the landing wheels is shown in FIG. 6 and is designated by the reference numeral 23. The central section of this axle is cylindrical and of sufficient length to extend between the parallel plates 21—21; the ends of the axle are square at 23a—23a and are received in the vertically positioned slots 22—22 in the parallel plates 21—21.

In FIG. 3 there is shown one of the landing wheels at 25. It is comprised by a tire, usually rubber, dished center sections 26—26 on the opposite sides, and an internal hub 27, which latter unites the dished center sections 26—26. This hub 27 freely receives the cylindrical section of the axle 23. Collars 28—28 surround the axle 23 and are positioned between the respective dished center sections 26 of the wheel and the adjacent plate 21. These collars are secured to the axle 23 by diametrically positioned pins 29.

The shock absorbers are comprised in part by pairs of cylinders 30—30, which are positioned along the vertical center line of each section of the undercarriage. Both pairs of cylinders 30—30 contain a compressible fluid. The lower cylinders of each pair thereof contain liquid and the upper cylinders of each pair contain air. At their tops the cylinders 30 are closed by end plates 32, which are secured to the cylinders by screws 31. For securing the cylinders in place brackets 34 are provided. These brackets have 270° bends therein at 34a and lugs 34b, which latter are approximately tangentially positioned with respect to said bends. The brackets are secured to the end plates 32 of the cylinder by bolts or machine screws 33, the 270° bends 34a in the brackets partially surrounding the intermediate and the lower rods 18 and 19, respectively, and the lugs 34b on the brackets are secured to the plates 21—21 by bolts or machine screws 35.

A piston 40 is mounted for reciprocating movement in each cylinder 30. In the circumference of each piston 40 there is formed at least one groove 41, which receives a piston ring 42. Also, at least one flow resisting passage 43 is formed through each piston 40 to provide for the passage of liquid, or air, from one side of the piston to the other, as the latter reciprocates. Along the axis of each piston 40 there is connected thereto a piston rod 44, which may be integrally formed with the piston, as shown, or pivotally connected thereto in the well known manner. The piston rods 44 reciprocate through holes 36 in the bottoms of the cylinders 40. Around the wall of each hole 36 in the bottom of the cylinder 40 there is formed a toroidal groove 37, in which there is placed a packing 38. At their outer ends the piston rods 44—44 of the aligned pistons are united in a bearing boss 45, which has a square hole 46 therethrough. The square ends 23a—23a of the axle 23 are received in the square holes 46 in the bearing bosses 45. Pins 24 are preferably provided through the square ends 23a of the axle 23 on the outside of the bearing bosses 45.

In use, as the airplane comes in for a landing, the landing wheels 25 strike the ground and the fuselage continues to move downward. The pistons 40 move upward in the cylinder 30, the square ends 23a—23a of the axle 23 sliding in the vertical bearing slots 22—22 in the plates 21—21. As the pistons 40 move upward in the lower cylinder 30, part of the liquid from the tops of these cylinders passes through the flow restricting passages 43 in the lower pistons 40 into the bottoms of the cylinders; similarly, part of the air from the tops of the upper cylinders 40 passes through the flow restricting passages 43 in the upper pistons 40 into the bottoms of the cylinders. The amount of energy of the impact dissipated in the form of heat is a function of the area of flow restricting passages 43 and the velocity of the liquid, or air, flowing through same. The smaller the area of the flow restricting passages 43 and the greater the velocity of the liquid, or air, through same, the more energy is dissipated in the form of heat and the greater is the resistance offered by the shock absorbers to the upward movement of the axle 23 and the landing wheels 25 relative to the fuselage of the airplane.

At the end of the downward movement of the fuselage of the airplane, and the upward movement of the pistons 40 in the cylinders 30, the energy stored in the compressed air in the upper cylinders 39, which was not dissipated in the form of heat, causes the fuselage of the airplane to move upward relative to the ground and the landing wheels 25. If this rebound should not be checked, the fuselage would move upward rapidly and tend to oscillate upward and downward. As the fuselage moves upward during the rebound, the pistons 40 move downward in the cylinders 30, the square ends 23a—23a of the axle again sliding in the bearing slots 22—22 in the plates 21—21, but in the opposite direction. In this action part of the air from the bottoms of the upper cylinders passes through the flow restricting passages 43 in the upper pistons 40 into the tops of the cylinders; similarly, part of the liquid from the bottoms of the lower cylinders 30 passes through the flow restricting passages 43 in the lower pistons 40 into the tops of the cylinders. The resistance offered to the flow of the air from the bottoms to the tops of the upper cylinders 30 and to the flow of the liquid from the bottoms to the tops of the lower cylinders 30 by the flow restricting passages 43 to the pistons 40 is sufficient to dissipate some of the energy stored in the air in the upper cylinders and thus absorb the energy of the rebound, so that the fuselage of the airplane rises relatively slowly and the tendency to oscillate is minimized.

Having now fully described my invention, what I claim as new and useful and desire to secure by Letters Patent of the United States is:

1. An airplane landing gear comprised by a pair of upper and lower parallel rigid tubular members aligned in one vertical plane and a pair of upper and lower parallel rigid tubular members aligned in a parallel vertical plane and adapted to be secured to the underside of the fuselage of an airplane, plates positioned between said upper and lower parallel rigid members and having vertically extending slots therein, a landing wheel positioned between said pairs of upper and lower parallel rigid members, an axle rotatably mounting said landing wheel and having its ends respectively received in and extending through the slots in said plates for free vertical movement therein, upper shock absorbers comprised by cylinders secured to the upper parallel rigid members, pistons freely mounted in said cylinders, and piston rods on said pistons secured at one end to the opposite ends of said axle, and lower shock absorbers comprised by cylinders secured to the lower parallel rigid members, pistons freely mounted in said cylinders, and piston rods on said pistons also secured at one end to the opposite ends of the axle.

2. An airplane landing gear comprised by a pair of upper and lower parallel rigid members aligned in one vertical plane and a pair of upper and lower parallel rigid members aligned in a parallel vertical plane and adapted to be secured to the underside of the fuselage of an airplane, plates positioned between said upper and lower parallel rigid members and having vertically extending slots therein, a landing wheel positioned between said pairs of upper and lower parallel rigid members, an axle rotatably mounting said landing wheel and having its ends respectively received in the slots in said plates for free vertical movement therein, upper shock absorbers comprised by cylinders secured to the upper parallel rigid members, pistons freely mounted in said cylinders, and piston rods on said pistons secured at one end to the opposite ends of said axle, and lower shock absorbers comprised by cylinders secured to the lower parallel rigid members, pistons freely mounted in said cylinders, and piston rods on said pistons also secured at one end to the opposite ends of the axle, said upper and lower shock absorbers being of the same dimension and said upper shock absorbers being filled with air and said lower shock absorbers being filled with liquid.

References Cited in the file of this patent

UNITED STATES PATENTS

| | | |
|---|---|---|
| 699,709 | Pulbrook | May 13, 1902 |
| 1,269,873 | Sorley | June 18, 1918 |
| 1,270,200 | Peterson | June 18, 1918 |
| 1,378,234 | Hughes | May 17, 1921 |
| 1,406,575 | Meade | Feb. 14, 1922 |
| 1,528,923 | Hofer et al. | Mar. 10, 1925 |
| 1,541,957 | Hooper | June 16, 1925 |
| 1,833,468 | Miyo | Nov. 24, 1931 |
| 2,150,576 | Bell | Mar. 14, 1939 |